(12) United States Patent
Takahashi (10) Patent No.: US 9,049,192 B2
(45) Date of Patent: *Jun. 2, 2015

(54) BIOMETRIC AUTHENTICATION METHOD AND COMPUTER SYSTEM

(71) Applicant: Hitachi, Ltd., Tokyo (JP)

(72) Inventor: Kenta Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,054

(22) Filed: May 29, 2014

(65) Prior Publication Data

US 2014/0281569 A1     Sep. 18, 2014

Related U.S. Application Data

(63) Continuation of application No. 14/083,895, filed on Nov. 19, 2013, now Pat. No. 8,762,735, which is a continuation of application No. 13/716,583, filed on Dec. 17, 2012, now Pat. No. 8,612,770, which is a continuation of application No. 12/848,346, filed on Aug. 2, 2010, now Pat. No. 8,356,183.

(30) Foreign Application Priority Data

Oct. 23, 2009   (JP) .................. 2009-244188

(51) Int. Cl.
*G06F 21/00*    (2013.01)
*H04L 29/06*    (2006.01)
*G06F 21/32*    (2013.01)

(52) U.S. Cl.
CPC .......... *H04L 63/0861* (2013.01); *G06F 21/32* (2013.01)

(58) Field of Classification Search
USPC .................................................. 713/185–186
See application file for complete search history.

(56) References Cited

U.S. PATENT DOCUMENTS

2007/0061590 A1 *  3/2007  Boye et al. .................... 713/186
2008/0037833 A1    2/2008  Takahashi et al.

FOREIGN PATENT DOCUMENTS

JP      2007-293807 A    11/2007

* cited by examiner

*Primary Examiner* — Ghazal Shehni
(74) *Attorney, Agent, or Firm* — Volpe and Koenig, P.C.

(57) ABSTRACT

A biometric authentication method for a computer system, the computer system comprising: a computer; and an authentication server, the biometric authentication method including steps of: extracting a first feature from the captured biometric information; generating a template polynomial for enrollment; extracting a second feature from the captured biometric information; generating a template polynomial for authentication; generating a correlation function for calculating a correlation between the template polynomial for authentication and the enrolled template polynomial; calculating a correlation value between the template polynomial for authentication and the enrolled template polynomial by using the generated correlation function, and determining based on the calculated correlation value whether or not the biometric information at the time of authentication coincides with the biometric information enrolled.

8 Claims, 6 Drawing Sheets

BIOMETRIC AUTHENTICATION METHOD AND COMPUTER SYSTEM

CROSS-REFERENCE TO RELATED APPLICATION

This application is a continuation of U.S. patent application Ser. No. 14/083,895 filed Nov. 19, 2013, which is a continuation of U.S. patent application Ser. No. 13/716,583 filed Dec. 17, 2012, which issued as U.S. Pat. No. 8,612,770 on Dec. 17, 2013, which is a continuation of U.S. patent Ser. No. 12/848,346 filed Aug. 2, 2010, which issued as U.S. Pat. No. 8,356,183 on Jan. 15, 2013, which claims priority from Japanese Patent application JP 2009-244188 filed Oct. 23, 2009, all of which are incorporated by reference as if fully set forth.

BACKGROUND

This invention relates to a biometric authentication method and system for authenticating a person's identity by using biometric information on the person.

A personal authentication system using biometric information captures biometric information on a person at a time of enrollment, extracts information called a "feature", and enrolls the extracted feature. At a time of authentication, the personal authentication system again extracts a feature from biometric information captured from the person, and determines whether or not to authenticate the person by matching the extracted feature against the enrolled feature.

Hereinbelow, the information to be enrolled is referred to as a "template for enrollment", and the information used at the time of authentication is referred to as a "template for authentication". In a case where the template for enrollment and the template for authentication are not distinguished from each other, both are referred to simply as a "template".

In a system in which a client terminal and an authentication server are coupled to each other via a network, in a case where the server executes biometric authentication on a user situated on a client terminal side, the server normally stores an enrolled template. The client terminal extracts the feature from the biometric information captured from the user at the time of authentication, and transmits the extracted feature (template for authentication) to the server. The server determines whether or not to authenticate the person by matching the received feature (template for authentication) against the enrolled template.

The template is information that may identify a person, and hence needs to be strictly managed as personal information, which necessitates a high management cost. Further, even when the template is strictly managed, many people are still psychologically hesitant to enroll a template in terms of privacy.

Further, the number of items of biometric information of each kind held by one person is limited (for example, only ten fingers are available in a case of enrolling fingerprints as the biometric information), and hence the template cannot be changed not as easily as a password or encryption key can. This leads to a problem that the biometric information cannot be used any longer in a case where leakage of the template occurs to cause a risk of forgery.

In addition, in a plurality of different systems in which templates, generated from the same biometric information, are enrolled, if one of the enrolled templates leaks from one of the systems, the other systems are also threatened, which are enrolled a template generated by same biometric information as leaking template.

In order to solve the above-mentioned problems, for example, Japanese Patent Application Laid-open No. 2007-293807 (hereinafter, referred to as "Document 1". The entire contents of which are incorporated herein by reference.) proposes a method (hereinafter, referred to as "cancelable biometrics") in which: at the time of enrollment of the biometric information, the client terminal uses a fixed function (a kind of encryption) and a secret parameter (a kind of encryption key) stored by the client terminal to transform the feature into a template for enrollment, and enrolls the generated template for enrollment in the server; at the time of authentication, the client terminal uses the same function and parameter to transform a feature of the biometric information newly extracted from the user into a template for authentication, and transmits the template for authentication generated by the transformation to the server; and the server matches the template for authentication against the enrolled template.

According to the method disclosed in Document 1, the privacy of a person is protected as follows. The template for enrollment and the template for authentication are each in a state in which the feature obtained from the original biometric information is kept concealed. As long as the client terminal stores the parameter used for the transformation in secret, the original feature cannot be known from the template stored in the server at the time of authentication.

Further, even if the template leaks, the client terminal creates another template for enrollment by changing the parameter used for the transformation, and enrolls the created template for enrollment in the server, thereby enabling security to be maintained.

Also in the plurality of different systems in which the templates for enrollment, generated from the same biometric information, are enrolled, the templates for enrollment created by the transformation using different parameters are enrolled in the server. This may prevent the security of the other systems from degrading even if one of the enrolled templates leaks from one of the systems.

A specific method of realizing the cancelable biometrics depends on the type of the biometric information, the matching algorithm, or the like. Document 1 discloses a method (hereinafter, referred to as "correlation invariant random filtering (or CIRF)") applicable to a biometric authentication technology, such as vein authentication, for determining a similarity based on a cross correlation between features (images).

SUMMARY OF THE INVENTION

According to Document 1 described above, the following processing is executed at the time of enrollment.

First, the client terminal calculates a basis transformed image X by performing a basis transform (discrete Fourier transform (or DFT) or number theoretic transform (or NTT)) on a feature image x extracted from the user's living body.

Then, the client terminal creates a scrambled image T by causing a filter image K, generated at random, to act on the basis transformed image X and calculating $T[i]=X[i]/K[i]$ for every i-th pixel of both, and enrolls the created scrambled image T in the server.

It should be noted that the filter image K is saved in a smart card or the like possessed by the user.

At the time of authentication, the following processing is executed.

First, the client terminal newly extracts a feature image y from the user's living body, flips pixels of the extracted feature image y in a vertical direction thereof and a lateral direction thereof, and then calculates an image Y by subjecting the flipped feature image y to a basis transform.

Then, the client terminal creates a scrambled image V by causing the filter image K, read from the user's smart card, to act on the image Y and calculating V[i]=Y[i]×K[i] for every i-th pixel of both, and transmits the created scrambled image V to the server.

The server calculates C[i]=T[i]×V[i] (=X[i]×Y[i]) for each pixel, and subjects an image C to an inverse basis transform (inverse discrete Fourier transform or inverse number theoretic transform) to thereby calculate a cross correlation function x*y between the feature image x and the feature image y. The server determines whether or not a match occurs in the biometric information by calculating a similarity between the feature image x and the feature image y from the cross correlation function.

As described above, the client terminal transmits to the server the scrambled image T obtained by transforming the feature image x by using the secret filter image K, and the scrambled image V obtained by transforming the feature image y by using the secret filter image K. Hence the server may execute matching processing while the feature image x and the feature image y are kept concealed from the server.

However, in a case where an administrator of the server makes a malicious attempt to break the feature image x and the feature image y, there is a possibility that the breaking may be successful based on partial information of the feature image x and the feature image y.

For example, in a case where one user repeatedly executes authentication processing a plurality of times, simultaneous equations may be written in terms of respective pixel values of the images Y from relationships among respective data items transmitted to the server at respective times of authentication processing.

Specifically, in a case where, for example, the authentication processing is repeated m times, assuming that feature images extracted at the respective times of authentication processing are y1, y2, ..., ym and that basis transformed images of the respective flipped feature images are Y1, Y2, ..., Ym, the data items to be transmitted to the server are V1=Y1×K, V2=Y2×K, ..., Vm=Ym×K, .... Therefore, the server may calculate V1/V2, V1/V3, ..., V1/Vm. Here, the equation V1/Vi=Y1/Yi is derived and may be changed as follows.

$$V1 \cdot Yi = Vi \cdot Y1$$

The basis transformed image Yi is obtained by subjecting the original feature image yi to a basis transform (linear transformation), and is expressed by a linear combination of the respective pixel values of yi. Therefore, the above-mentioned equation may be regarded as linear simultaneous equations with the respective pixel values of yi being unknown variables. Specifically, based on the combination of i=2, 3, ..., m, (m−1)N linear equations are formulated in terms of mN unknown variables as a whole.

The above-mentioned linear equations cannot be uniquely solved because the unknown variables are larger than the number of equations. However, in a case where an attacker knows the partial information of the feature image x and the feature image y, for example, in a case where the attacker has knowledge about peripheral parts of the feature image x and the feature image y always having a background color or other such knowledge, the number of the unknown variables decreases, and the equation may be uniquely solved. In other words, there is a possibility that the feature image x and the feature image y may be broken.

This disclosed system provides a cancelable biometric method of high security, which is resistant to an attack using knowledge of original images as described above.

A representative aspect of disclosed system is as follows. A biometric authentication method for a computer system, the computer system comprising: a computer for capturing biometric information from a user and generating authentication information used for authenticating the user; and an authentication server for executing authentication processing by using the authentication information generated by the computer, the computer comprising a first processor, a first memory coupled to the first processor, a first storage medium coupled to the first processor, and a first communication module for performing communications with the authentication server, the first processor executing a program stored in the first memory to implement a feature extraction module, a polynomial generation module, an inverse polynomial calculation module, and a first polynomial residue calculation module, the first storage medium storing at least one modulo polynomial used for dividing a predetermined polynomial, the authentication server comprising, a second processor a second memory coupled to the second processor, a second storage medium coupled to the second processor, and a second communication module for performing communications with the computer, the second processor executing a program stored in the second memory to implement a control module, a second polynomial residue calculation module, and a matching determination module, the biometric authentication method including: a first step of capturing, by the feature extraction module, the biometric information from the user at a time of enrollment of the biometric information on the user, extracting a first feature, which is formed of a plurality of feature elements and indicate a characteristic of the biometric information, from the captured biometric information, and storing the extracted first feature into the first memory; a second step of reading, by the feature extraction module, the extracted first feature from the first memory, generating a first feature polynomial having each of the plurality of feature elements of the extracted first feature as coefficients thereof, and storing the generated first feature polynomial into the first memory; a third step of generating, by the polynomial generation module, a parameter polynomial used for concealing the first feature polynomial, and storing the generated parameter polynomial into the first memory; a fourth step of generating, by the inverse polynomial calculation module, an inverse parameter polynomial becoming a calculated residue polynomial of 1, the residue polynomial being calculated by dividing a product of the inverse parameter polynomial and the parameter polynomial by one of the at least one modulo polynomial, and storing the generated inverse parameter polynomial into the first memory; a fifth step of reading, by the first polynomial residue calculation module, the first feature polynomial and the inverse parameter polynomial from the first memory, generating a template polynomial for enrollment by calculating a residue polynomial by dividing a product of the first feature polynomial and the inverse parameter polynomial by one of the at least one modulo polynomial, and storing the generated template polynomial for enrollment into the first memory; a sixth step of reading, by the first communication module, the generated template polynomial for enrollment from the first memory, and transmitting the generated template polynomial for enrollment to the authentication server; a seventh step of enrolling, by the control module, the template polynomial for enrollment received from the computer in the second storage medium; an eighth step of capturing, by the feature extraction module, the biometric information from the user at a time of authentication of the biometric information on the user, extracting a second feature, which is formed of a plurality of feature elements and indicate a characteristic of the biometric information, from the captured biometric information, and storing the extracted second feature into the first memory; a ninth step of reading, by the feature extraction module, the extracted second feature from the first memory, generating a second feature polynomial having each of the plurality of feature elements of the extracted second feature as coefficients thereof, and storing the generated second feature polynomial into the first memory; a tenth step of generating, by the polynomial generation module, a parameter polynomial used for concealing the second feature polynomial, and storing the generated parameter polynomial into the first memory; an eleventh step of reading, by the first polynomial residue calculation module, the second feature polynomial and the parameter polynomial from the first memory, generating a template polynomial for authentication by calculating the residue polynomial by dividing a product of the second feature polynomial and the parameter polynomial by one of the at least one modulo polynomial, and storing the generated template polynomial for authentication into the first memory; a twelfth step of reading, by the first communication module, the generated template polynomial for authentication from the first memory, and transmitting the generated template polynomial for authentication to the authentication server; a thirteenth step of reading, by the control module, the enrolled template polynomial from the second storage medium, and calculating, by the second polynomial residue calculation module, a residue polynomial for correlation function generation by dividing a product of the enrolled template polynomial and the template polynomial for authentication by one of the at least one modulo polynomial, and storing the calculated residue polynomial for correlation function generation into the second memory; a fourteenth step of reading, by the second polynomial residue calculation module, the residue polynomial for correlation function generation from the second memory, generating a correlation function for calculating a correlation between the template polynomial for authentication and the enrolled template polynomial by using the read residue polynomial for correlation function generation, and storing the generated correlation function into the second memory; and a fifteenth step of calculating, by the matching determination module, a correlation value between the template polynomial for authentication and the enrolled template polynomial by using the generated correlation function, and determining based on the calculated correlation value whether or not the biometric information captured from the user at the time of authentication coincides with the biometric information enrolled in the authentication server.

According to the teaching herein, in a biometric authentication system for authenticating the user based on a cross correlation between the enrolled template polynomial and the template polynomial for authentication, it is possible to perform the authentication processing with the biometric information on the user being kept concealed from the server, which may prevent the biometric information from being leaked from the server. For example, it is possible to maintain high security even against such a high level attack that an administrator of the server fraudulently attempts to estimate the feature of the biometric information on the user.

These and other benefits are described throughout the present specification. A further understanding of the nature and advantages of the invention may be realized by reference to the remaining portions of the specification and the attached drawings.

BRIEF DESCRIPTION OF THE DRAWINGS

The present invention can be appreciated by the description which follows in conjunction with the following figures, wherein.

DETAILED DESCRIPTION OF THE EMBODIMENT

An embodiment of this invention is described by taking an example of a cancelable biometric system capable of performing, by a server, matching in the biometric information with a feature of the biometric information being kept concealed from the server by transforming the feature of the biometric information.

Figure 1:
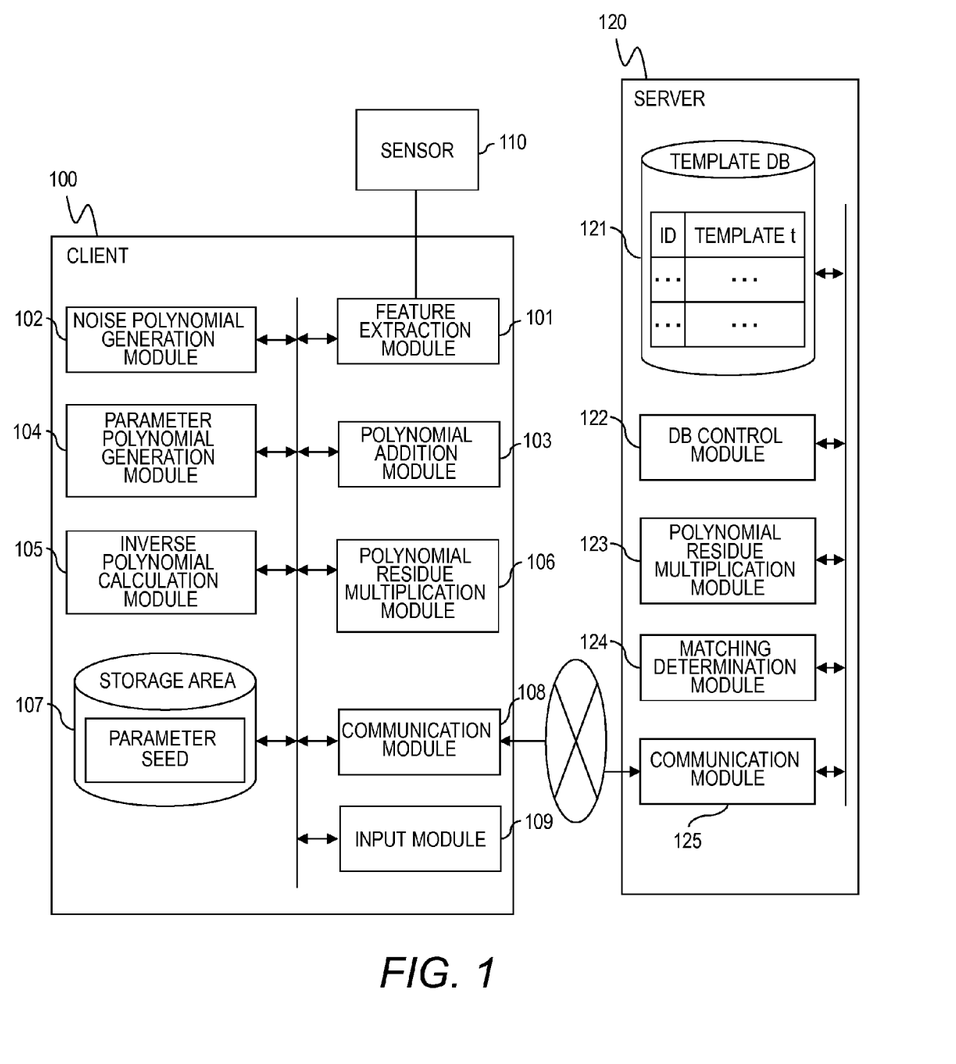
FIG. 1 is a block diagram illustrating an example of a system configuration of a cancelable biometric system according to an embodiment of this invention.

FIG. 1 is a block diagram illustrating an example of a system configuration of the cancelable biometric system according to the embodiment of this invention.

The cancelable biometric system according to this embodiment includes a client terminal 100 and an authentication server 120. The client terminal 100 and the authentication server 120 are coupled to each other via network such as the Internet or an intranet. Hereinafter, the client terminal 100 and the authentication server 120 are referred to simply as "client 100" and "server 120", respectively.

Possible examples of the cancelable biometric system include a configuration in which the client 100 is a PC operated by a user and the server 120 is a server device managed by a bank in a case where, for example, the user uses Internet banking from his/her home.

The client 100 captures biometric information (for example, fingerprint or vein) at a time of an enrollment processing or at a time of an authentication processing, extracts a feature from the captured biometric information, and further transforms the extracted feature.

The client 100 comprises a feature extraction module 101, a noise polynomial generation module 102, a polynomial addition module 103, a parameter polynomial generation module 104, an inverse polynomial calculation module 105, a polynomial residue multiplication module 106, a storage area 107, a communication module 108, and an input module 109.

The feature extraction module 101 extracts the feature of the biometric information captured from a sensor 110, and creates a feature polynomial using the captured feature of the biometric information. The noise polynomial generation module 102 generates a random number and creates a noise polynomial. The polynomial addition module 103 adds the noise polynomial to the feature polynomial. The parameter polynomial generation module 104 generates a parameter polynomial by using a parameter seed stored in the storage area 107.

The inverse polynomial calculation module 105 calculates an inverse polynomial Q with respect to a given polynomial P modulo a predetermined modulo polynomial F. The term "inverse polynomial Q" used herein refers to a polynomial becoming a residue polynomial of 1, calculated by dividing a polynomial, which is obtained by multiplying the polynomial P by the inverse polynomial Q, by the modulo polynomial F (QP mod F=1).

The polynomial residue multiplication module 106 multiplies polynomials modulo a predetermined modulo polynomial, and generates a template for enrollment and a template for authentication. The storage area 107 stores the parameter seed. The term "parameter seed" used herein refers to secret information having a predetermined length (for example, 256 bits). It should be noted that the storage area 107 may store other information.

The communication module 108 performs communications with the server 120 via the network. The input module 109 receives an input of information such as an ID from the user operating the client 100.

Further, the sensor 110 for capturing the biometric information (for example, fingerprint or vein) from the user is coupled to the client 100. It should be noted that the client 100 may comprise the sensor 110.

The server 120 stores the template for enrollment transmitted from the client 100, and executes matching regarding the user by using the enrolled template.

The server 120 comprises a template database (DB) 121, a DB control module 122, a polynomial residue multiplication module 123, a matching determination module 124, and a communication module 125.

The template DB 121 manages a correspondence between each user's ID and his/her enrolled template. The DB control module 122 controls searching, reading, writing, and the like with respect to the template DB 121. The polynomial residue multiplication module 123 multiplies polynomials modulo a predetermined modulo polynomial.

The matching determination module 124 calculates a similarity between the feature extracted from the biometric information captured at the time of enrollment and the feature extracted from the biometric information captured at the time of authentication, and determines whether or not the feature extracted from the biometric information captured at the time of enrollment coincides with the feature extracted from the biometric information captured at the time of authentication. The communication module 125 performs communications with the client 100 via the network.

Figure 2A:
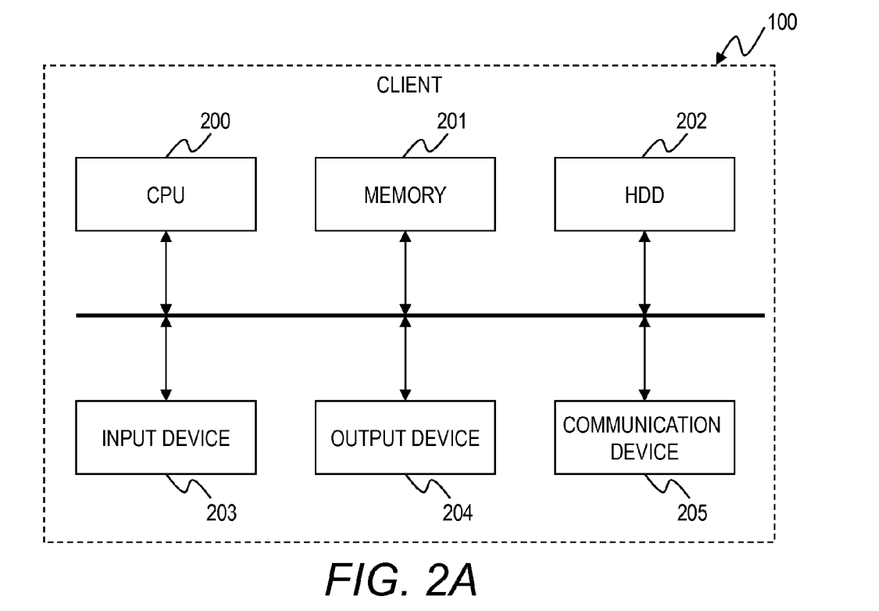
FIG. 2A is a block diagram illustrating a hardware configuration of a client according to the embodiment of this invention.
Figure 2B:
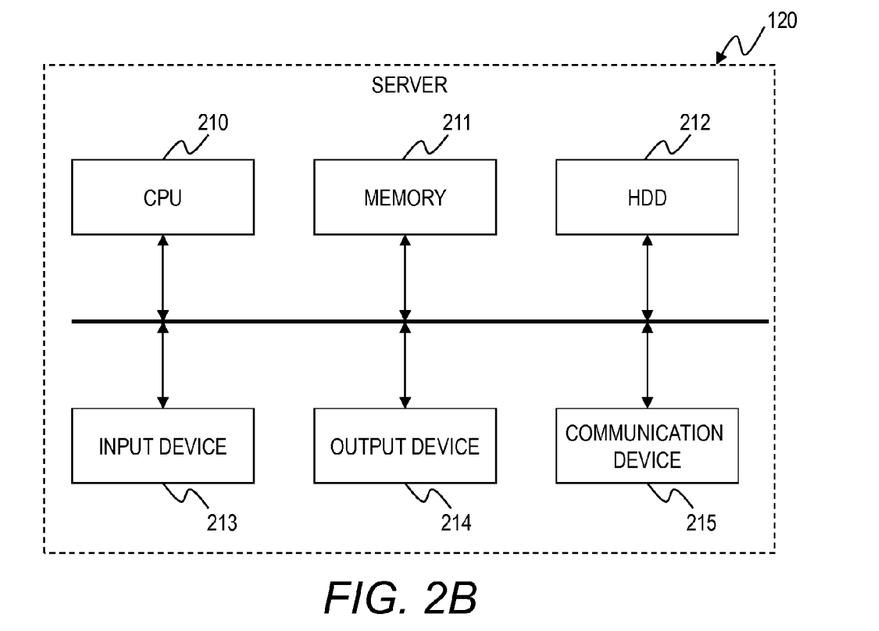
FIG. 2B is a block diagram illustrating a hardware configuration of a server according to the embodiment of this invention.

FIG. 2A is a block diagram illustrating a hardware configuration of the client 100 according to the embodiment of this invention. FIG. 2B is a block diagram illustrating a hardware configuration of the server 120 according to the embodiment of this invention.

As illustrated in FIG. 2A, the client 100 comprises a central processing unit (CPU) 200, a memory 201, a hard disk drive (HDD) 202, an input device 203, an output device 204, and a communication device 205.

The CPU 200 executes a program loaded into the memory 201 to implement respective processing modules described as follows.

The memory 201 stores a program for implementing functions comprised in the client 100. In this embodiment, the memory 201 stores a program for implementing the noise polynomial generation module 102, the polynomial addition module 103, the parameter polynomial generation module 104, the inverse polynomial calculation module 105, and the polynomial residue multiplication module 106.

The HDD 202 stores information and a program those are necessary for the CPU 200 to execute the processing. In this embodiment, the storage area 107 is set on the HDD 202.

The input device 203 is a device for inputting information to the client 100. Possible examples of the input device 203 include a keyboard. In this embodiment, the input device 203 serves as the input module 109. The output device 204 is a device used by the client 100 for outputting processing results and the like. Possible examples of the output device 204 include a display.

The communication device 205 is a device for performing communications with another device. In this embodiment, the communication device 205 corresponds to the communication module 108.

As illustrated in FIG. 2B, the server 120 comprises a CPU 210, a memory 211, an HDD 212, an input device 213, an output device 214, and a communication device 215.

The CPU 210 executes a program loaded into the memory 211 to implement respective processing modules described as follows.

The memory 211 stores a program for implementing functions comprised in the server 120. In this embodiment, the memory 211 stores a program for implementing the DB control module 122, the polynomial residue multiplication module 123, and the matching determination module 124.

The HDD 212 stores information and a program those are necessary for the CPU 210 to execute the processing. In this embodiment, the template DB 121 is stored on a storage area of the HDD 212.

The input device 213 is a device for inputting information to the server 120. Possible examples of the input device 213 include a keyboard. The output device 214 is a device used by the server 120 for outputting processing results and the like. Possible examples of the output device 214 include a display.

The communication device 215 is a device for performing communications with another device. In this embodiment, the communication device 215 corresponds to the communication module 125.

Examples of the biometric information used in this embodiment include a fingerprint image, a vein image, or an iris image. Further, examples of the feature include an image (two-dimensional array of brightness values) binarized by executing a highlighting process on the fingerprint image or the vein image, or a bit array (one-dimensional array of {0,1}) called an "iris code" created from the iris image.

In a case where the feature such as the vein image or the iris code is a one-dimensional array, the similarity between arbitrary two features is calculated as follows.

$$C[u] = \sum_{x=0}^{n-1} A[x]B[x-u] \quad (|u| \leq \Delta x) \qquad \text{(Equation 1)}$$

Here, A[x] and B[x−u] represent arrays of arbitrary two features. In addition, x is a coordinate representing a position. Hereinafter, C[u] is referred to as a "cross correlation array".

In this embodiment, n is set as a size of the array such as a vein image or an iris code in the case of the one-dimensional array. Therefore, the coordinate x takes values ranging from 0 through (n−1). In addition, u represents a difference from the coordinate x, and takes values having an interval of |u|≤Δx. It should be noted that Δx represents a maximum tolerance of the difference.

In other words, the similarity between the arbitrary two features is calculated as a cross correlation in consideration of the difference in the position.

In a case where the size of the array A[x] is n, the array A[x] includes n elements as described below.

$$A[0], \ldots, A[n-1]$$

In this case, the cross correlation array C[u], expressed by (Equation 1), includes (2Δx+1) elements as described below.

$$C[-\Delta x], \ldots, C[\Delta x]$$

In a case where the feature such as the vein image or the iris code is a two-dimensional array, the similarity between arbitrary two features is calculated as follows.

$$C[u, v] = \sum_{x=0}^{n-1}\sum_{y=0}^{m-1} A[x, y]B[x-u, y-v] \quad (|u| \le \Delta x, |v| \le \Delta y) \quad \text{(Equation 2)}$$

Here, A[x,y] and B[x−u,y−v] represent arrays of arbitrary two features. In addition, x and y are coordinates representing a position. Hereinafter, C[u, v] is referred to as a "cross correlation array".

In this embodiment, n×m is set as a size of the array such as a vein image or an iris code in the case of the two-dimensional array. Therefore, the coordinate x takes values ranging from 0 through (n−1) and the coordinate y takes values ranging from 0 through (m−1). In addition, u represents a difference from the coordinate x, and takes values having an interval of |u|≤Δx. v represents a difference from the coordinate y, and takes values having an interval of |v|≤Δy. It should be noted that Δx and Δy each represent a maximum tolerance of the difference.

In a case where the size of the array A[x,y] is n×m, the array A[x,y] includes n×m elements as described below.

$$A[0, 0], \ldots, A[0, m-1]$$
$$\ldots$$
$$A[n-1, 0], \ldots, A[n-1, m-1]$$

It should be noted that the array B[x,y] also includes n×m elements as described above.

In this case, the cross correlation array C[u,v] expressed by (Equation 2) includes (2Δx+1)×(2Δj+1) elements as described below.

$$C[-\Delta i, -\Delta j], \ldots, C[\Delta i, -\Delta j]$$
$$\ldots$$
$$C[-\Delta i, -\Delta j], \ldots, C[\Delta i, \Delta j]$$

It should be noted that in this embodiment, each element of the array has an integer value in both the cases where the feature is one-dimensional and two-dimensional. For example, each element of the iris code or the vein feature image has an integer value.

It should be noted that in the above-mentioned (Equation 1) and (Equation 2), the element of the array in the coordinate excluded from a domain is regarded as "0". For example, in the case of the one-dimensional array, the element of the array B[x−u] in terms of x satisfying x<u is "0".

The cross correlation array C[u] (or C[u,v]) represents a cross correlation obtained in a case where the feature B[x] is shifted from the feature A[x] by u (or the feature B[x,y] is shifted from the feature A[x,y] by (u,v)). In a personal authentication system using iris authentication, vein authentication, fingerprint authentication, or the like, it is possible to determine whether or not to authenticate the person based on the cross correlation array C[u] (or C[u,v]).

In the following description, in a case where the one dimension and the two dimension are not distinguished from each other, for example, the array A[x] or the array A[x,y] is also referred to as the array A. The same holds true of other equations.

Here, an array Br obtained by reversing the order of the array B is defined as follows.

(In a Case of One Dimension)

$$Br[x]=B[n-x-1](i=0, \ldots, n-1) \quad \text{(Equation 3)}$$

(In a Case of Two Dimension)

$$Br[x,y]=B[n-x-1,m-y-1](i=0, \ldots, n-1, j=0, \ldots, m-1) \quad \text{(Equation 4)}$$

In a case of using the array Br[x] and the array Br[x,y], Equation 1 and (Equation 2) may be rewritten into a convolution equation as follows.

(In the Case of One Dimension)

$$C[u] = \sum_{x=0}^{n-1} A[x]Br[n-x+u+1] \quad (|u| \le \Delta x) \quad \text{(Equation 5)}$$

(In the Case of Two Dimension)

$$C[u, v] = \sum_{x=0}^{n-1}\sum_{y=0}^{m-1} A[x, y]$$
$$Br[n-x+u+1, y+v+1] \quad (|u| \le \Delta x, |v| \le \Delta y) \quad \text{[Equation 6]}$$

In this embodiment, it is assumed that polynomials having the respective elements of the array A and the array Br as their coefficients. Specifically, such polynomials as described below are assumed.

(In the Case of One Dimension)

$$a(x) = \sum_{i=0}^{n-1} A[i]x^i = A[n-1]x^{n-1} + A[n-2]x^{n-2} + \ldots ,$$
$$A[1]x + A[0] \quad \text{(Equation 7)}$$

$$b(x) = \sum_{i=0}^{n-1} Br[i]x^i = Br[n-1]x^{n-1} + Br[n-2]x^{n-2} + \ldots ,$$
$$Br[1]x + Br[0] \quad \text{(Equation 8)}$$

(In the Case of Two Dimension)

$$a(x, y) = \sum_{i=0}^{n-1} \sum_{j=0}^{m-1} A[i, j] x^i y^j \quad \text{(Equation 9)}$$
$$= A[n-1, m-1]x^{n-1}y^{m-1} + \ldots + A[0, m-1]y^{m-1}$$
$$\vdots +$$
$$A[n-1, 0]x^{n-1} + \ldots + A[0, 0]$$

$$b(x, y) = \sum_{i=0}^{n-1} \sum_{j=0}^{m-1} Br[i, j] x^i y^j \quad \text{(Equation 10)}$$
$$= Br[n-1, m-1]x^{n-1}y^{m-1} + \ldots + Br[0, m-1]y^{m-1}$$
$$\vdots +$$
$$Br[n-1, 0]x^{n-1} + \ldots + Br[0, 0]$$

Hereinafter, the polynomials a and the polynomials b shown in (Equation 7) through (Equation 10) are referred to as feature polynomials of the biometric information.

Here, a polynomial c is calculated by multiplying the feature polynomial a by the feature polynomial b. The multiplication of the feature polynomial a and the feature polynomial b may be calculated by convolution of coefficient arrays, and hence the respective elements of the cross correlation array C, defined by (Equation 5) or (Equation 6), appear in the coefficients of the polynomial c. Here, the polynomial c is set as follows.

$$c(x) = \sum_i c_i x^i, \; c(x, y) = \sum_{i,j} c_i x^i \quad \text{(Equation 11)}$$

In this case, specific respective elements are expressed as follows.

(In the Case of One Dimension)

$$c_{n+u-1} = C[u] \; (|u| \leq \Delta i) \quad \text{(Equation 12)}$$

(In the Case of Two Dimension)

$$c_{n+u-1, m+v-1} = C[u,v] \; (|u| \leq \Delta i, |v| \leq \Delta j) \quad \text{(Equation 13)}$$

Therefore, in order to calculate the cross correlation array C, it suffices to calculate the polynomial c obtained by multiplying the feature polynomial a by the feature polynomial b.

Here, all the coefficients of the polynomial c do not need to be calculated in consideration of the fact that a tolerated difference interval of a difference u from x and a difference v from y are $|u| \leq \Delta i$ and $|v| \leq \Delta j$, respectively. Therefore, a residue polynomial c' using a polynomial f(x) and a polynomial g(y) is assumed as follows.

$$f(x) = x^{n+\Delta i} - \alpha, g(y) = y^{m+\Delta j} - \beta$$

Here, α and β are arbitrary integers. Further, the polynomial f(x) and the polynomial g(y) are referred to as "modulo polynomials". It should be noted that the modulo polynomial f(x) and the modulo polynomial g(y) are set in advance, and stores in the storage area 107.

The modulo polynomial f(x) and the modulo polynomial g(y) shown in (Equation 14) are each a polynomial that has a coefficient of the leading term being 1 and includes only constant terms except the leading term. It should be noted that the polynomial with the coefficient of the leading term being 1 is also referred to as "monic polynomial".

The residue polynomial c' using (Equation 14) is expressed as follows.

(In the Case of One Dimension)

$$c'(x) = a(x)b(x) \bmod f(x) \quad \text{(Equation 15)}$$

(In the Case of Two Dimension)

$$c'(x,y) = a(x,y)b(x,y) \bmod \{f(x), g(x)\} \quad \text{(Equation 16)}$$

It should be noted that the right-hand side of (Equation 16) expresses a residue polynomial obtained by dividing a product polynomial a(x,y)b(x,y) by the polynomial f(x) and the polynomial g(y). Also regarding the residue polynomials c' shown in (Equation 15) and (Equation 16), the following relationship is established in the same manner as in (Equation 12) or (Equation 13).

(In the Case of One Dimension)

$$c'_{n+u-1} = C[u] \; (|u| \leq \Delta i) \quad \text{(Equation 17)}$$

(In the Case of Two Dimension)

$$c'_{n+u-1, m+v-1} = C[u,v] \; (|u| \leq i, |v| \leq \Delta j) \quad \text{(Equation 18)}$$

Further, a defined ring of the coefficient of each polynomial is replaced by a residue ring modulo Zq instead of an integer ring Z. It should be noted that q is set as a predetermined odd prime number, and a representative of the residue ring modulo Zq is expressed as follows.

$$Z_q = \{-\frac{(q-1)}{2}, -\frac{(q-3)}{2}, \ldots, \quad \text{(Equation 19)}$$
$$-1, 0, 1, \ldots, -\frac{(q-3)}{2}, \frac{(q-1)}{2}\}$$

In this embodiment, q is set to be sufficiently large so that (q−1)/2 is equal to or larger than the maximum value of an absolute value of the cross correlation array C. With this setting, the coefficient of the residue polynomial c' calculated by (Equation 15) or (Equation 16) does not change even when the coefficient of each polynomial is replaced by Zq, and hence the cross correlation array C may be obtained correctly. Therefore, unless otherwise specified in the following description, the coefficient of each polynomial is set as an element of Zq. It should be noted that this produces an effect of reducing a data amount processed by the client 100 and the server 120.

With the above-mentioned premise in mind, description is made of a scheme for realizing cancelable biometrics according to this embodiment.

In order to realize the cancelable biometrics according to this embodiment, it suffices to calculate the cross correlation array C while the feature polynomial a and the feature polynomial b are kept concealed.

Therefore, the feature polynomial a and the feature polynomial b are transformed to be concealed as follows.

(In the Case of One Dimension)

$$t(x) = a(x)k^{-1}(x) \bmod f(x) \quad \text{(Equation 20)}$$

$$v(x) = b(x)k(x) \bmod f(x) \quad \text{(Equation 21)}$$

(In the Case of Two Dimension)

$$t(x,y) = a(x,y)k^{-1}(x,y) \bmod \{f(x), g(y)\} \quad \text{(Equation 22)}$$

$$v(x,y) = b(x,y)k(x,y) \bmod \{f(x), g(y)\} \quad \text{(Equation 23)}$$

Here, the polynomial k is a secret polynomial corresponding to an encryption key. Further, the polynomial $k^{-1}$ satisfies the following relationship (Equation 24) or (Equation 25) with the polynomial k. Hereinafter, the polynomial k is referred to as a "parameter polynomial", while the polynomial $k^{-1}$ is referred to as an "inverse parameter polynomial".

(In the Case of One Dimension)

$$k(x)k^{-1}(x) = 1 \bmod f(x) \qquad \text{(Equation 24)}$$

(In the Case of Two Dimension)

$$k(x,y)k^{-1}(x,y) = 1 \bmod \{f(x), g(y)\} \qquad \text{(Equation 25)}$$

It should be noted that the prime number q is selected so as to satisfy the following equations.

(In the Case of One Dimension)

$$n+\Delta i | q-1 \qquad \text{(Equation 26)}$$

(In the Case of Two Dimension)

$$n+\Delta i | q-1 \text{ and } m+\Delta j | q-1 \qquad \text{(Equation 27)}$$

Further, when ω is set to satisfy α=β=ω as an arbitrary primitive root of a multiplicative group F×q of a finite field Fq, the modulo polynomial f(x) and the modulo polynomial g(y) defined by (Equation 14) become irreducible polynomials on Zq[x] and Zq[y], respectively. Then, in the case of one dimension, a polynomial residue ring Zq[x]/(f(x)) becomes a finite field. Also in the case of two dimension, when n+Δi and m+Δj are relatively prime, a polynomial residue ring Zq[x,y]/(f(x),g(y)) becomes a finite field.

Therefore, in both the cases of one dimension and two dimension, the inverse parameter polynomial $k^{-1}$ exists in terms of an arbitrary parameter polynomial k.

It should be noted that even when n+Δi and m+Δj are not relatively prime, it can become n+Δi and m+Δj to be relatively prime by incrementing the size m of the array B[x,y] is repeatedly by 1, and adding a column all the elements of which are 0 to the right side (after the (m−1)th column) of the array A[x,y] and the array B[x,y]. Because all the elements of the added column are 0, the cross correlation array C[x,y] shown in (Equation 2) does not change.

More generally speaking, In the case of one dimension, it is a necessary and sufficient condition for the polynomial residue ring Zq[x]/(f(x)) to become a finite field that a polynomial ideal (f(x)) generated by the modulo polynomial f(x) on the polynomial ring Zq[x] is a prime ideal. In the same manner, in the case of two dimension, it is a necessary and sufficient condition for the polynomial residue ring Zq[x,y]/(f(x),g(y)) to become a finite field that a polynomial ideal (f(x),g(y)) generated by a pair of the modulo polynomial f(x) and the modulo polynomial g(y) on the polynomial ring Zq[x,y] is a prime ideal.

Here, in a case where a polynomial ideal I of an arbitrary ring R is ab∈1 in terms of arbitrary elements a,b of the ring R, the polynomial ideal I is referred to as a prime ideal when a∈1 or b∈1 is established.

In the case where the polynomial residue ring R=Zq[x]/(f(x)) (or Zq[x,y]/(f(x),g(y))) is a finite field, when the parameter polynomial k moves over entire R−{0}, the polynomial t and the polynomial v, calculated by (Equation 20) through (Equation 23), move over the entire R−{0} in the same manner.

Therefore, when an arbitrary parameter polynomial k∈R−{0} is selected uniformly randomly, the polynomial t and the polynomial v also become uniformly random on R−{0}. Accordingly, the coefficients of the polynomial t and the polynomial v are statistically indistinguishable from a random number sequence on Zq.

In other words, the above-mentioned transformation inhibits the original feature polynomial a and the original feature polynomial b from being estimated from the polynomial t and the polynomial v, thereby achieving information theoretical security.

In the conventional scheme for realizing the cancelable biometrics, a limitation is imposed on the filter image K. Specifically, in order to calculate 1/K, all the respective elements of the filter image K needs to be a value other than "0". This raises a fear of breaking because an attacker may narrow down the feature polynomial a and the feature polynomial b from the above-mentioned limitation imposed on the filter image K.

However, according to this embodiment, by controlling the modulo polynomial f(x) and the modulo polynomial g(y) to be irreducible polynomials, the inverse parameter polynomial $k^{-1}$ may always be calculated in terms of an arbitrary parameter polynomial k.

Therefore, the parameter polynomial k may be randomly selected, which is used for transforming the feature polynomial a and the feature polynomial b. This makes breaking impossible because the attacker cannot narrow down the feature polynomial a and the feature polynomial b.

Further, according to this embodiment, the correlation may be correctly calculated by setting the modulo polynomial f(x) and the modulo polynomial g(y) as shown in (Equation 14).

Figure 6:
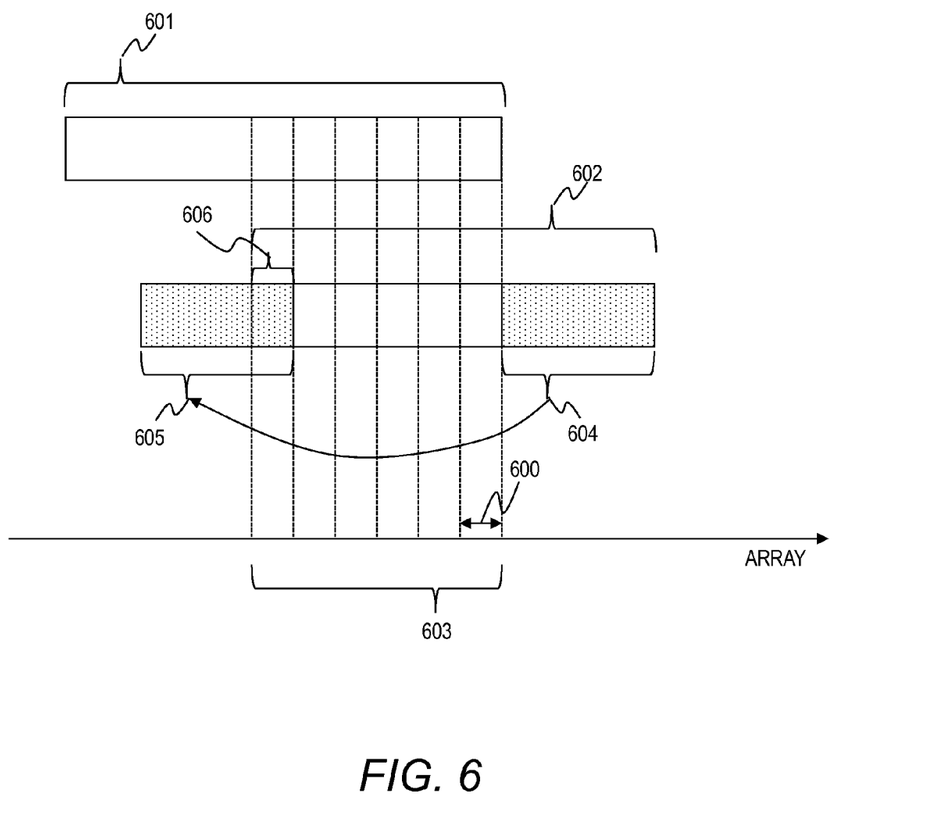
FIG. 6 is a diagram illustrating a correlation in the case of an one-dimensional array according to the embodiment of this invention.

FIG. 6 is a diagram illustrating a correlation in the case of the one-dimensional array according to the embodiment of this invention.

FIG. 6 illustrates a correlation between a feature 601 and a feature 602. A portion representing a degree of correlation between the feature 601 and the feature 602 is an interval 603. A segment 600 represents a spacing between arrays.

In this embodiment, the feature polynomial is defined on the polynomial residue ring R=Zq[x]/(f(x)), and hence a portion 604 moves around the cycle to a position of a portion 605. Therefore, the correlation cannot be correctly obtained because of an overlapping portion other than the interval 603 that is originally the correlation between the feature 601 and the feature 602. Further, in the case of polynomials including a primary term such as the modulo polynomial f(x) and the modulo polynomial g(y), there is another overlapping portion such as a portion 606. This may cause degradation in matching accuracy.

However, according to this embodiment, by setting the modulo polynomial f(x) and the modulo polynomial g(y) as shown in (Equation 14), it is possible to avoid the above-mentioned degradation in matching accuracy.

Next, description is made of specific processing for realizing the cancelable biometrics according to this embodiment.

Figure 3:
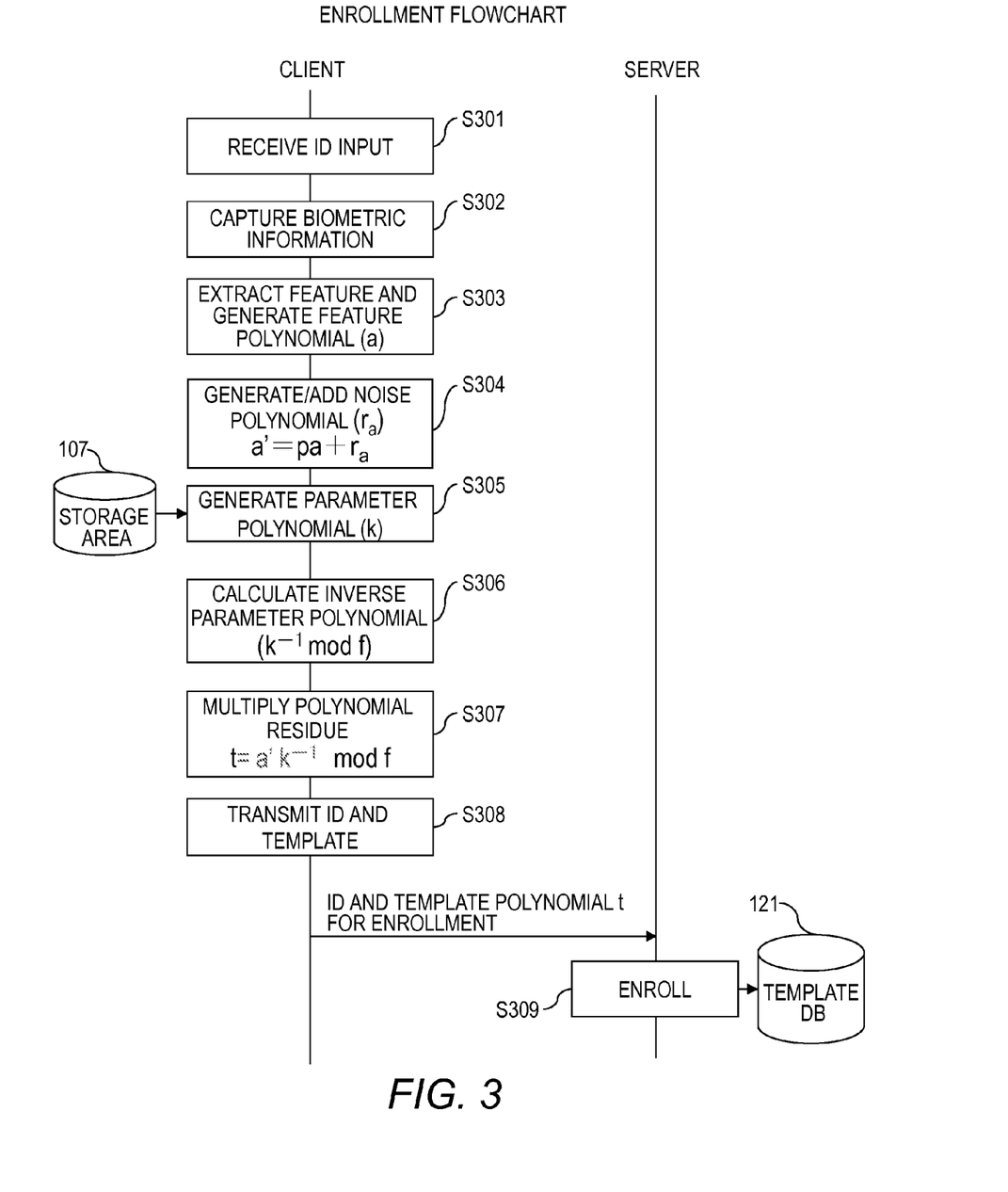
FIG. 3 is a flowchart illustrating enrollment processing for the biometric information executed at a time of enrollment according to the embodiment of this invention.

FIG. 3 is a flowchart illustrating enrollment processing for the biometric information executed at the time of enrollment according to the embodiment of this invention. It should be noted that processing results obtained in respective steps described below are stored in at least one of the memories 201 and 211 and the HDDs 202 and 212.

First, the input module 109 of the client 100 receives an ID input from a user (S301).

Then, the client 100 captures biometric information on the user by using the sensor 110 (S302).

The feature extraction module 101 extracts a feature from the captured biometric information, and generates a feature polynomial a based on the extracted feature (S303).

The noise polynomial generation module 102 generates a noise polynomial $r_a$, and the polynomial addition module 103 uses the generated noise polynomial $r_a$ to calculate a noise-added feature polynomial a' (S304). Here, the noise polynomial $r_a$ is generated so that an absolute value of each coefficient is equal to or smaller than a predetermined integer δ.

Further, the noise-added feature polynomial a' is calculated as follows.

$$a'=pa+r_a \quad \text{(Equation 28)}$$

Here, p represents a predetermined integer value.

The parameter polynomial generation module 104 reads a parameter seed from the storage area 107. Based on the read parameter seed, the parameter polynomial generation module 104 generates a pseudo random number sequence formed of integers included in the interval $[-(q-1)/2,(q-1)/2]$, and further generates the parameter polynomial k having the generated pseudo random numbers as its coefficient (S305). It should be noted that the pseudo random number sequence is generated depending solely upon the above-mentioned parameter seed. In other words, if the pseudo random number sequence is generated again based on the above-mentioned parameter seed at the time of authentication, the same pseudo random number sequence is obtained, and hence the same parameter polynomial k is generated at the time of enrollment and at the time of authentication.

The inverse polynomial calculation module 105 calculates the inverse parameter polynomial $k^{-1}$ (mod f) of the calculated parameter polynomial k (S306).

The polynomial residue multiplication module 106 calculates residue multiplication between the calculated inverse parameter polynomial $k^{-1}$ and the noise-added feature polynomial a' to generate a template polynomial t for enrollment (S307). Specifically, the template polynomial t for enrollment is calculated as follows.

$$t = a'k^{-1} \bmod f \quad \text{(Equation 29)}$$

The communication module 108 transmits the user's ID and the template polynomial t for enrollment to the server 120 (S308).

The server 120 receives the user's ID and the template polynomial t for enrollment, and the DB control module 122 enrolls (stores) in the template DB 121 the received user's ID and template polynomial t for enrollment in association with each other (S309).

Figure 4:
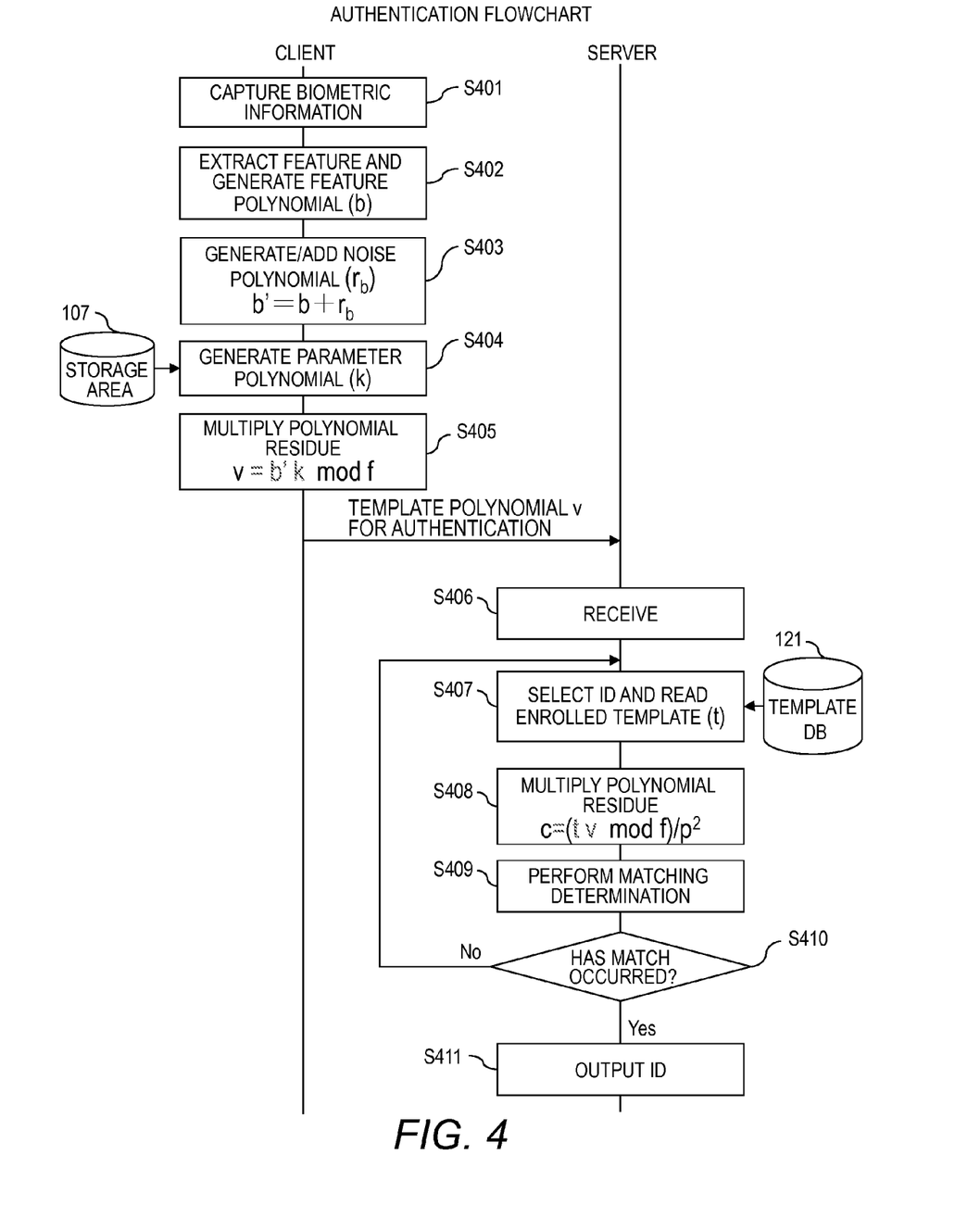
FIG. 4 is a flowchart illustrating authentication processing for the biometric information executed at a time of authentication according to the embodiment of this invention.

FIG. 4 is a flowchart illustrating authentication processing for the biometric information executed at the time of authentication according to the embodiment of this invention. It should be noted that processing results obtained in respective steps described below are stored in at least one of the memories 201 and 211 and the HDDs 202 and 212.

In this embodiment, it is unnecessary for the user to input his/her ID in the processing executed at the time of authentication. The user only needs to present his/her living body, and a system identifies the user and determines his/her ID.

First, the client 100 captures the biometric information on the user by using the sensor 110 (S401).

The feature extraction module 101 extracts a feature from the captured biometric information, and generates a feature polynomial b based on the extracted feature (S402). It should be noted that the feature polynomial b is generated so as to have the array Br as its coefficient, which is obtained by reversing the feature array B.

The noise polynomial generation module 102 generates a noise polynomial $r_b$, and the polynomial addition module 103 uses the generated noise polynomial $r_b$ to calculate a noise-added feature polynomial b' (S403). Here, the noise polynomial $r_b$ is generated so that an absolute value of each coefficient is equal to or smaller than the predetermined integer δ. Further, the noise-added feature polynomial b' is calculated as follows.

$$b'=pb+r_b \quad \text{(Equation 30)}$$

It should be noted that δ and p are the same as used in the processing performed at the time of enrollment.

The parameter polynomial generation module 104 reads the parameter seed from the storage area 107, and based on the read parameter seed, generates the parameter polynomial k (S404). It should be noted that the parameter polynomial k is the same as the parameter polynomial k generated at the time of enrollment.

The polynomial residue multiplication module 106 calculates residue multiplication between the parameter polynomial and the noise-added feature polynomial b' to generate a template polynomial v for authentication (S405). Specifically, the template polynomial v for authentication is calculated as follows.

$$v = b'k \bmod f \quad \text{(Equation 31)}$$

The communication module 108 transmits the generated template polynomial v for authentication to the server 120 (S406).

The server 120 receives the generated template polynomial v for authentication from the client 100 (S406).

The DB control module 122 selects an arbitrary ID from the template DB 121, and reads the enrolled template polynomial t corresponding to the selected ID (S407).

The polynomial residue multiplication module 123 calculates residue multiplication between the read enrolled template polynomial t and the received template polynomial v for authentication, and calculates a cross correlation polynomial c (S408). Specifically, the cross correlation polynomial c is calculated as follows.

$$c = (tv \bmod f)/p^2 \quad \text{(Equation 32)}$$

The matching determination module 124 uses the coefficient of the calculated cross correlation polynomial c to calculate a similarity (or distance) between the biometric information items and to determine whether or not to authenticate the person (S409).

In a case where it is determined not to authenticate the person, the server 120 returns to S407 to execute the same processing of Steps S407 through S410 (S410).

In a case where it is determined to authenticate the person, the server 120 outputs the ID selected in Step S407, and ends the authentication processing (S411). The ID is output to the output device 214.

It should be noted that in Steps S410 and S411, the processing of Steps S407 through S409 may be repeatedly executed on all the IDs enrolled in the template DB 121 to output all the IDs determined to authenticate the person in Step S410.

In this embodiment, the processing for adding noise is executed in the above-mentioned Steps S304 and S403. Specifically, the noise polynomial $r_a$ and the noise polynomial $r_b$ are added to the feature polynomial a and the feature polynomial b, respectively.

Accordingly, it is possible to prevent attacking even if the attacker has knowledge about the original feature polynomial a and the original feature polynomial b (for example, knowledge about a peripheral part of the feature image always having a background color).

For example, by adding a noise polynomial to a feature polynomial, the peripheral part of the feature image does not always have the background color. This may enhance concealment properties of the feature polynomial a and the feature polynomial b.

However, depending upon the processing for adding noise, an error is mixed into the cross correlation polynomial c, which may degrade matching accuracy. In order to prevent the degradation in matching accuracy, in this embodiment, the absolute value of each coefficient of the noise polynomial is set to be equal to or smaller than the predetermined integer value δ. In addition, the residue polynomials c', obtained by multiplying the feature polynomial a and the feature polynomial b by p, are used in the above-mentioned Steps S304 and S403.

Here, the residue polynomial c' is specifically calculated as follows.

$$c' = tv \bmod f \quad \text{(Equation 33)}$$
$$= (a'k^{-1})(b'k) \bmod f$$
$$= a'b' \bmod f$$
$$= (pa + r_a)(pb + r_b) \bmod f$$
$$= p^2 ab + p(ar_b + br_a) + r_a r_b \bmod f$$

Further, by dividing the residue polynomial c' by $p^2$, the cross correlation polynomial c' is calculated as follows.

$$c = c'/p^2 \quad \text{(Equation 34)}$$
$$= ab + \varepsilon(\varepsilon = ((ar_b + br_a)/p + r_a r_b/p^2))$$

Therefore, appropriate setting of the integer value δ sufficiently reduces an error ε, which may suppress the degradation in matching accuracy. In other words, the degradation in matching accuracy may be suppressed if the error ε is relatively smaller than a value obtained by multiplying a feature polynomial a(x) by a feature polynomial b(x) for calculating the correlation. For example, in a case where δ<p in all of the noise polynomial $r_a$ and the noise polynomial $r_b$, the degradation in matching accuracy may be prevented to some extent.

Further, a method of allowing the error to some extent may be adopted in order to maintain security. In other words, the error ε is allowed within the interval of a predetermined value.

The above-mentioned method of deciding the integer value δ for adjusting the error ε to an appropriate size varies depending upon the biometric information used for the biometrics, and hence it is desired that the method be decided empirically.

It should be noted that Steps S304 and S403 are not limited to the noise addition shown in (Equation 28) and (Equation 30), respectively, and noise may be added as follows.

$$a' = a + pr_a \quad \text{(Equation 35)}$$

$$b' = b + pr_b \quad \text{(Equation 36)}$$

Unlike the cases of (Equation 28) and (Equation 30), the use of (Equation 35) and (Equation 36) eliminates the need for setting the absolute value of each coefficient of the noise polynomial to be equal to or smaller than the integer value δ.

In the case of using (Equation 35) and (Equation 36), the cross correlation polynomial c is calculated as follows in Step S408.

$$c = (tv \bmod f) \bmod p \quad \text{(Equation 37)}$$

The residue polynomial c' is calculated as follows.

$$c' = tv \bmod f \quad \text{(Equation 38)}$$
$$= (a'k^{-1})(b'k) \bmod f$$
$$= a'b' \bmod f$$
$$= (a + pr_a)(b + pr_b) \bmod f$$
$$= ab + p(ar_b + br_a + pr_a r_b) \bmod f$$

Therefore, by setting q to a sufficiently larger value than p, the absolute value of the coefficient of the polynomial on the right-hand side of (Equation 38) does not become larger than (q−1)/2. With this setting, the cross correlation polynomial c is calculated as follows.

$$c = (c' \bmod f) \bmod p \quad \text{(Equation 39)}$$
$$= (ab + p(ar_b + br_a + pr_a r_b) \bmod f) \bmod p$$
$$= ab \bmod f$$

With the above-mentioned setting, the correct cross correlation may be calculated.

Next, description is made of a method of updating a template. By executing the processing on a periodic basis, it is possible to realize cancelable biometrics higher in security. In other words, the template used at the time of authentication changes on a periodic basis, and hence the attacker cannot break the original feature, which may realize high security.

Figure 5:
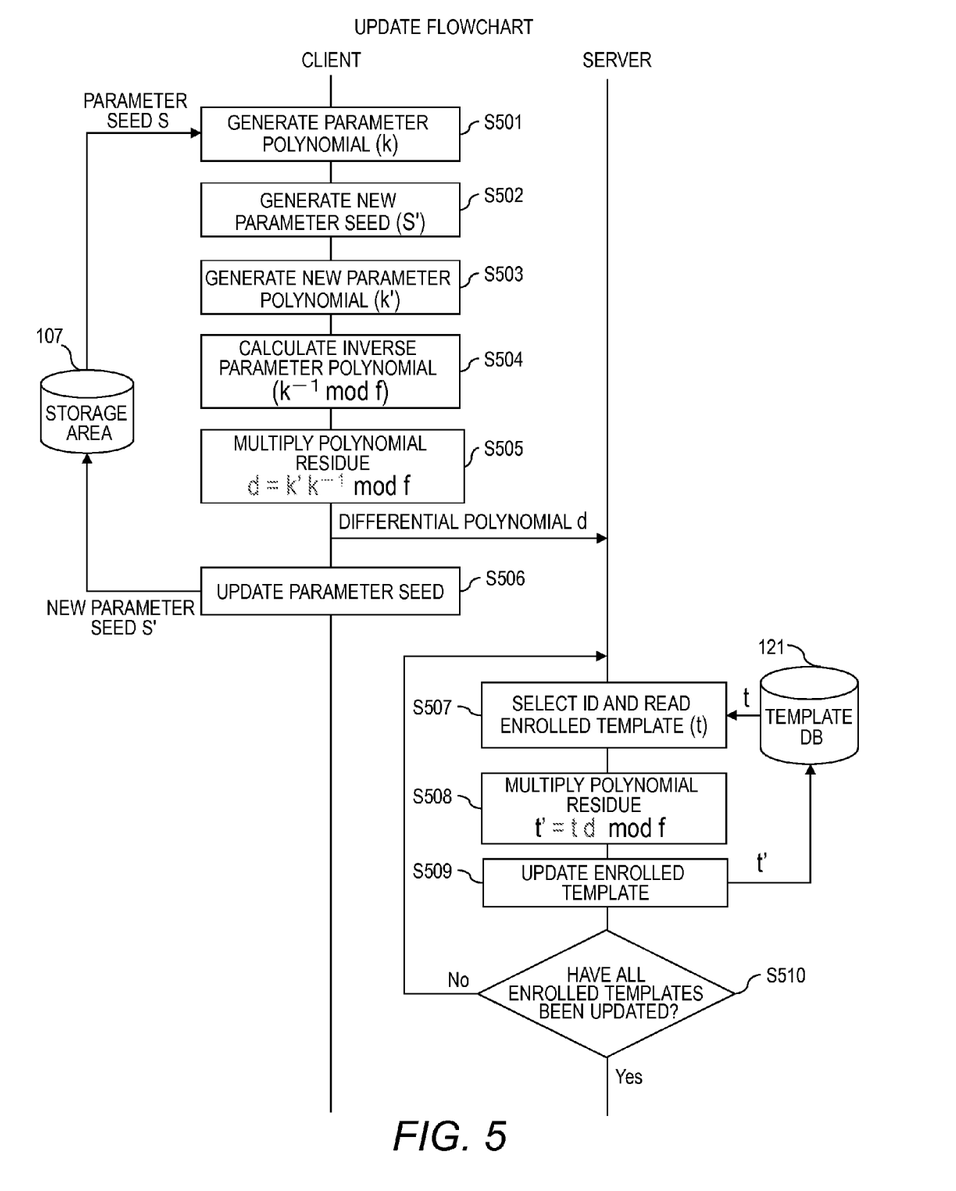
FIG. 5 is a flowchart illustrating update processing according to the embodiment of this invention.

FIG. 5 is a flowchart illustrating update processing according to the embodiment of this invention. It should be noted that processing results obtained in respective steps described below are stored in at least one of the memories 201 and 211 and the HDDs 202 and 212.

The parameter polynomial generation module 104 reads the parameter seed from the storage area 107, and based on the read parameter seed, generates the parameter polynomial k (S501). It should be noted that the generated parameter polynomial k is the same as the parameter polynomial k generated at the time of enrollment.

The client 100 newly generates a parameter seed (S502). The processing of Step S502 is executed by, for example, the parameter polynomial generation module 104.

The parameter polynomial generation module 104 generates a new parameter polynomial k' based on the newly generated parameter seed (S503). It should be noted that the same method as that of Step S305 is used for creating the new parameter polynomial k'.

The inverse polynomial calculation module 105 calculates the inverse parameter polynomial $k^{-1}$ (mod f) of the parameter polynomial k (S504).

The polynomial residue multiplication module 106 calculates residue multiplication between the calculated inverse parameter polynomial $k^{-1}$ and the newly generated parameter polynomial k', as shown in (Equation 40), to generate a differential polynomial d, and transmits the generated differential polynomial d to the server 120 (S505).

$$d = k'k^{-1} \bmod f \quad \text{(Equation 40)}$$

The client 100 deletes the parameter seed stored in the storage area 107, and writes the newly generated parameter seed to the storage area 107 (S506). The processing of Step S506 is executed by, for example, the parameter polynomial generation module 104.

The DB control module 122 of the server 120 that has received the differential polynomial d selects an arbitrary ID, reads the enrolled template polynomial t corresponding to the selected ID from the template DB 121 (S507).

The polynomial residue multiplication module 123 calculates residue multiplication between the read enrolled template polynomial t and the received differential polynomial d to generate a new enrolled template polynomial t' (S508).

$$t' = td \bmod f \quad \text{(Equation 41)}$$

The DB control module 122 deletes the enrolled template polynomial t corresponding to the selected ID from the template DB 121, and enrolls the newly generated enrolled template polynomial t' in the template DB 121 (S509).

The server 120 determines whether or not the update of the enrolled template polynomial has been completed for all the IDs stored in the template DB 121 (S510).

In a case where it is determined that the update of the enrolled template polynomial has been completed for all the IDs stored in the template DB 121, the server 120 ends the update processing.

In a case where it is determined that the update of the enrolled template polynomial has not been completed for all the IDs stored in the template DB 121, the server 120 returns to Step S507 to select another ID and execute the same processing of Steps 507 through S510.

According to this embodiment, even if the template or the parameter seed leaks, security may be maintained by executing at least one of revocation and update of the information that has leaked.

Further, the update processing is periodically executed, and hence the user does not need to enroll his/her biometric information again, and a background processing may be performed, saving time and labor for the user. Further, the update processing may be executed by a batch processing on a regular basis.

In the update processing, the newly generated parameter polynomial k' and the parameter polynomial k before the update cannot be identified from the differential polynomial d. Therefore, even if the administrator of the server 120 performs an illegal operation in the update processing, the original feature polynomial a cannot be broken from the template polynomial t.

In this embodiment, the case of executing both the enrollment processing and the authentication processing is described, but this invention is not limited thereto, and only one of the processings may be executed. For example, the method described in this embodiment may be employed for only one of the enrolled template and the template for authentication that is likely to leak.

According to this invention, the polynomial calculated for executing biometric authentication processing is a polynomial on a predetermined finite field, and hence an inverse parameter polynomial always exists for an arbitrary parameter polynomial. This increases arbitrariness of the parameter polynomial, thereby making the breaking of a template impossible.

Further, the addition of the noise polynomial to the feature polynomial may enhance security even against the attacker who knows partial information on the template. Further, the noise polynomial is defined so as to calculate the correct correlation between the enrolled template and the template for authentication, which may prevent the degradation in matching accuracy.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A biometric authentication method for a computer system,
   the computer system including:
   a plurality of computers for obtaining biometric information from a user and generating authentication information used for authenticating the user; and
   a server for executing authentication processing by using the authentication information, which is coupled to the plurality of computers,
   the biometric authentication method including:
   a first step of extracting, by at least one of the plurality of computers, a first feature based on the obtained biometric information from the user;
   a second step of generating, by the at least one of the plurality of computers, first parameter information, which is used for keeping the extracted first feature secret, and second parameter information;
   a third step of generating, by the at least one of the plurality of computers, template information for enrollment by executing a calculation which uses the first feature and the first parameter information;
   a forth step of transmitting, by the at least one of the plurality of computers, the generated template information for enrollment to the server;
   a fifth step of storing, by the server, the template information for enrollment;
   a sixth step of obtaining, by the at least one of the plurality of computers, the biometric information from the user, and extracting a second feature of the obtained biometric information, in a case of authenticating the user;
   a seventh step of generating, by the at least one of the plurality of computers, template information for authentication by executing an operation which uses the second feature and the second parameter information;
   a eighth step of transmitting, by the at least one of the plurality of computers, the generated template information for authentication to the server; and
   a ninth step of calculating, by the server, a similarity between the first feature and the second feature by using the template information for authentication and the template information for enrollment, and authenticating the user based on the calculated similarity.

2. The biometric authentication method according to claim 1, wherein:
   the first parameter information is a first parameter polynomial;
   the second parameter information is a second parameter polynomial;
   a residue polynomial equal 1, which is calculated by dividing a product of the first parameter polynomial and the second parameter polynomial by a modulo polynomial;
   the template information for enrollment is generated based on a product of the first feature and the first parameter polynomial; and
   the template information for authentication is generated based on a product of the second feature and the second parameter polynomial.

3. The biometric authentication method according to claim 2, wherein:
   the first parameter polynomial is an inverse parameter polynomial; and
   the second parameter polynomial is a parameter polynomial.

4. The biometric authentication method according to claim 3, wherein the ninth step further includes the steps of:
   calculating a correlation value based on the template information for authentication and the template information for enrollment; and
   calculating the similarity based on the calculated correlation value.

5. A computer system, comprising:
   a plurality of computers for obtaining biometric information from a user and generating authentication information used for authenticating the user; and a server for executing authentication processing by using the authentication information, which is coupled to the plurality of computers, wherein at least one of the plurality of computers includes:

a feature extraction module for extracting a first feature based on the obtained biometric information from the user;

a parameter information generation module for generating first parameter information, which is used for keeping the extracted first feature secret, and second parameter information;

a template information generation module for generating template information for enrollment by executing an operation which uses the first feature and the first parameter information; and a transmission module for transmitting the generated template information for enrollment to the server, wherein the server includes:

a storage module for storing the template information for enrollment; and a matching determination module for authenticating the user, wherein the feature extraction module obtains the biometric information from the user, and extracts a second feature of the obtained biometric information, in a case of authenticating the user, wherein the template information generation module generates template information for authentication by executing an operation which uses the second feature and the second parameter information, wherein the transmission module transmits the generated template information for authentication to the server, wherein the matching determination module is configured to:

calculate a similarity between the first feature and the second feature by using the template information for authentication and the template information for enrollment; and authenticate the user based on the calculated similarity.

6. The computer system according to claim 5, wherein:

the first parameter information is a first parameter polynomial;

the second parameter information is a second parameter polynomial;

a residue polynomial equal 1, which is calculated by dividing a product of the first parameter polynomial and the second parameter polynomial by a modulo polynomial;

the template information for enrollment is generated based on a product of the first feature and the first parameter polynomial; and the template information for authentication is generated based on a product of the second feature and the second parameter polynomial.

7. The computer system according to claim 6, wherein:

the first parameter polynomial is an inverse parameter polynomial; and the second parameter polynomial is a parameter polynomial.

8. The computer system according to claim 7, wherein the matching determination module is configured to:

calculate a correlation value based on the template information for authentication and the template information for enrollment; and calculate the similarity based on the calculated correlation value.

* * * * *